US005161294A

United States Patent [19]

Haland

[11] Patent Number: 5,161,294

[45] Date of Patent: Nov. 10, 1992

[54] TOOL DEVICE FOR USE IN REPLACING AN INSTRUMENT DISPOSED IN A NORMALLY INACCESIBLE OR DANGEROUS ENVIRONMENT

[76] Inventor: Terje Haland, Andreas Harestadsvei 42, N-4070 Randaberg, Norway

[21] Appl. No.: 671,490

[22] Filed: Mar. 19, 1991

[30] Foreign Application Priority Data

Mar. 19, 1990 [NO] Norway ................................ 901252

[51] Int. Cl.[5] ............................................ B23P 19/04

[52] U.S. Cl. .................................... 29/252; 29/213.1; 29/721; 29/888.42

[58] Field of Search ...................... 29/213.1, 214, 216, 29/221.6, 244, 252, 261, 235, 402.3, 402.8, 721, 888.03, 888.4, 888.41, 888.42, 249, 281.1, 281.5; 81/124.1

[56] References Cited

U.S. PATENT DOCUMENTS

| | | | |
|---|---|---|---|
| 1,725,169 | 8/1929 | Wooldridge | 29/261 |
| 3,063,316 | 11/1962 | Salierno | 81/124.1 |
| 3,377,691 | 4/1968 | Kasper et al. | 29/213.1 X |
| 3,388,450 | 6/1968 | Forsman | 29/213.1 |
| 3,487,528 | 1/1970 | Shultz | 29/261 X |
| 4,535,657 | 8/1985 | Farris | 81/124.1 |
| 4,953,276 | 9/1990 | Kusmer et al. | 29/252 X |

FOREIGN PATENT DOCUMENTS

| | | | |
|---|---|---|---|
| 0266621 | 5/1988 | European Pat. Off. . | |
| 8907191 | 8/1989 | PCT Int'l Appl. . | |
| 2096929 | 10/1982 | United Kingdom | 29/221.6 |
| 2209361 | 5/1989 | United Kingdom . | |
| 2231071 | 11/1990 | United Kingdom . | |

*Primary Examiner*—Joseph M. Gorski
*Assistant Examiner*—Peter Dungba Vo
*Attorney, Agent, or Firm*—Ladas & Parry

[57] ABSTRACT

A tool device for use in replacing an instrument (12) or another device which, in the operative position thereof, is surrounded by an instrument housing which may be coupled into a fluid line, especially at a critical location and/or in a place difficult to get at, e.g. under water, and/or within risky surroundings, and wherein said instrument (12), in the operative position thereof, is locked against extraction/pushing-out with respect to the instrument housing. Also, the invention comprises an instrument housing and a locking tool for use together with such an instrument (12), as well as a method for replacing the instrument.

The tool device (2) has a tool housing (2') having a charging chamber (3) formed in order to accommodate a first locking tool (27) for neutralizing the locking of the instrument (12) to the instrument housing; a new intact instrument (12') having a design identical to that of said instrument (12) to be replaced; as well as a second locking tool (27') for locking of the new instrument (12') to the instrument housing subsequent to the new instrument (12') being in operative position within the instrument housing. The tool device (2) is provided with a pushing device (31) for pushing out the instrument (12) to be replaced and first locking tool (27), as well as for pushing in a new instrument (12) into the instrument housing.

11 Claims, 5 Drawing Sheets

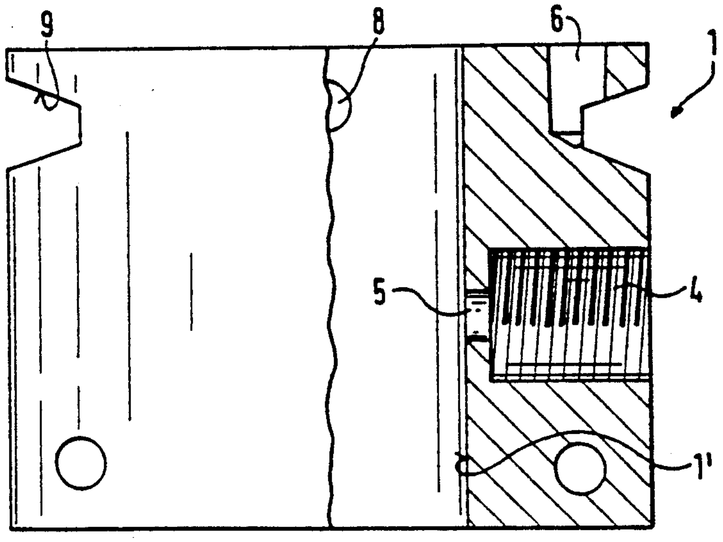
Fig. 2
Fig. 3
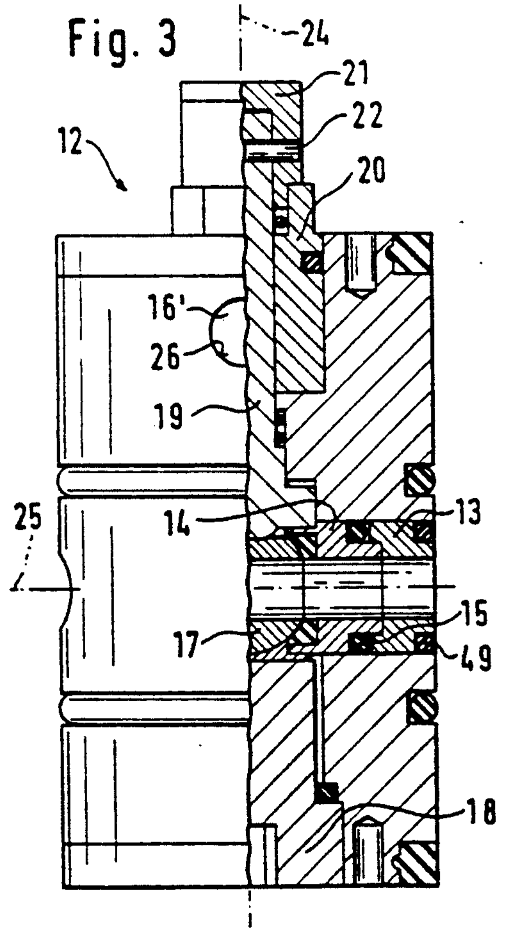
Fig. 4
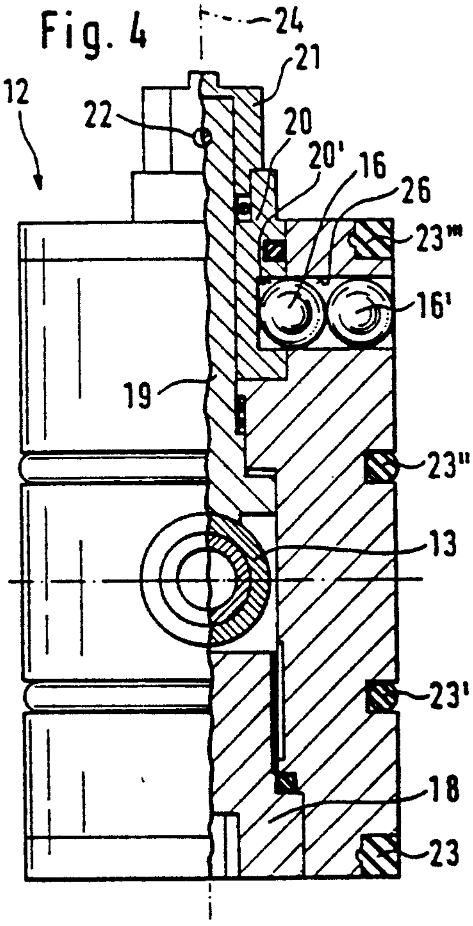

TOOL DEVICE FOR USE IN REPLACING AN INSTRUMENT DISPOSED IN A NORMALLY INACCESIBLE OR DANGEROUS ENVIRONMENT

The present invention relates to a tool device for use in replacing an instrument or another device which, in the operative position thereof, is surrounded by an instrument housing which may be coupled into a fluid line, especially at a critical location and/or in a place difficult to get at, e.g. under water, and/or within risky surroundings, and wherein said instrument, in the operative position thereof, is locked against extraction/-pushing-out with respect to the instrument housing. Also, the invention comprises an instrument housing and a locking tool for use together with such an instrument, as well as a method for replacing the instrument.

BACKGROUND OF THE INVENTION

The invention which has a very extensive field of applications, is especially associated with the replacement/maintenance/repairing of instruments at critical locations and/or places difficult of access and-/or within risky surroundings.

The invention is particularly adapted for subsea applications and may, advantageously, be used when replacing instruments incorporated into or being associated with subsea installations.

The major advantages of the tool device, the instrument housing the locking tool, and the method according to the invention will, however, likewise be obtainable in instrument replacements within low/high pressure systems wherein circulation of inflammable and/or explosive and/or corrosive fluids takes place.

Moreover, the invention may, advantageously, be utilized in, for example, a radioactive environment wherein the replacement of the instrument is effected by means of a robot arm.

However, the fields of application of the present invention defined in the foregoing are to be considered as non-limiting examples only, a number of further applications being conceivable besides the particularly mentioned ones.

The instrument or another device to be replaced by means of the invention, may fundamentally be any kind of instrument or another device and will be indicated as "instrument" only in the following. However, as should be mentioned, the housing of this instrument according to the present invention is presupposed to be intact during and after the replacement operation, and that this instrument housing according to the invention is formed partly in order to enable locking of the instrument from withdrawal/pushing-out in the operative positions thereof (e.g. open/closed), partly in order to allow the withdrawal/pushing-out of the instrument from the instrument housing for replacing it with a new identical instrument as soon as said withdrawal-preventing locking has been neutralized.

As associated with this invention, the term device/instrument comprises i.a. all kinds of valves, especially instrumentation valves, wherein the instrument housing according to the present invention is maintained during-/after the replacement operation; a large number of transducers such as pressure transducers, temperature transducers, signal and measuring transducers; a plurality of various sensor devices, as well as flow measuring instruments, all having a corresponding housing design. In each single case, said valves, transducers, sensors and measuring instruments are mounted at critical locations and/ or in places difficult of access, e.g. in subsea or risky surroundings.

As a concrete example of the practical use of the invention within the oil industry may be mentioned the replacement of a high pressure valve (a ball valve) installed on a well frame at large sea depths, and in the following, the invention will substantially be described in connection with such a valve replacement. Such a high pressure ball valve would be coupled into a flexible hydraulic control line, which may lead to another (main) valve incorporated into a blowout preventer or a so-called Christmas tree.

In order to effect replacement of such a valve according to conventional or technique, the valve has to be opened or demounted by divers, leaving the hydraulic control line open during the replacement operation. This will inevitably result in the possibility of leakage of the medium (high pressure oil) within the control line, a very disadvantageous effect per se. However, substantially more undesirable is the fact that the open control line allows entry of sea water, forming a source of contamination of a substantial size.

When a control line has been contaminated by sea water in this manner, a cleaning and flushing process must be carried out until desired cleanness of the control line has been achieved. Such a cleaning and flushing process in order to remove sea water from the control line, is simply defined as "purging" within the area in question, and one gets an impression of how time-consuming and cumbersome such a process may be, when it is mentioned that such hydraulic control lines to be "purged" may have a length of 10–20 kilometers.

Prior art technique for the replacement of other instruments, e.g. pressure sensor instruments of transducer type, comprises mounting of a plurality of identical instruments, side by side, at each single measuring point. Thereby, one may avoid cumbersome diving operations; an error or failure in one instrument being correctable through the switching-over to another, intact instrument. The number of transducers which, according to today's technique, is to be mounted at each measuring point, may vary and will be the subject matter of practical discussions, but sooner or later all of them will usually be used up and, thus, eventually a need for actual replacements will arise. Then, one has to resort to conventional replacement technique with the limitations, deficiencies and disadvantages involved therewith.

SUMMARY OF THE INVENTION

A main object of the present invention is to indicate a new efficient tool device of the kind defined introductorily, with which the replacement of instruments and other devices may be carried out, avoiding the disadvantages associated with prior art technique within the fields of application in question, and to provide a novel "allround" instrument housing and a locking tool for use together with such an instrument, as well as a method for replacing the instrument.

During the practical realization of the invention, leakage into/out of the pipe line wherein the instrument housing has been inserted should be completely or substantially avoided. When the instrument is a high pressure valve, the housing thereof is to be incorporated into a process/control line and, thus, has connectors in the form of inlet and outlet means for the line, the valve in the housing is to be replaced without any form of leakage/pollution, neither into or out of the process/-control line. Optimally, the conditions may be arranged such that the instrument replacement by means of the invention may be carried out when maintaining a pressure in the process/control line.

Tool device, instrument, instrument housing, locking tool and method according to the invention is primarily based on remote control. When used subsea, one has aimed at utilizing the invention at very large sea depths.

For example, the tool device may be constructed for an operating pressure in the order of 1400 bar.

In accordance with the invention, the above-mentioned objects are achieved through the features appearing from the following claims.

The tool device comprises a charging chamber having an open discharge end and into which the locking tool, the new intact unit (instrument) and the locking-neutralizing tool are charged in said consecutive order, so that the locking-neutralizing tool will be situated closest to the discharge opening of the charging chamber. During the replacement operation, the discharge opening of said charging chamber is brought into immediate association to the insertion opening of the instrument housing leading to the instrument-accommodating cavity thereof. Centering, fixing and clamping of the device to the instrument housing are carried out, whereafter the locking-neutralizing tool is activated in order to neutralize the locking of the defective instrument to the instrument housing. Thereafter, a linear displacement movement is effected, during which said locking-neutralizing tool and the following, new and intact instrument is pushed into the instrumentaccommodating cavity of the instrument housing. During this introductory phase of the replacement operation (the locking of the new instrument within the instrument housing completes the replacement), sealing means on the locking-neutralizing tool and on the new intact instrument come into action and prevent the penetration of fluids from the surroundings into the instrument housing. Finally, the locking tool of the tool device is activated, said locking tool being adapted to effect locking of the new instrument within the instrument housing. For example, the locking of the defective instrument may be neutralized through a rotation of 90 degrees and, for example, the locking of the new instrument may be effected through a similar rotation of 90 degrees, either in the opposite direction of or in the same direction as the first-mentioned rotation.

The instrument housing according to the invention is formed with a through-going cavity for tight accommodation of the instrument as well as locking means adapted for releasable engagement with locking means on the instrument, the through-going cavity of the instrument housing exhibiting the same cross-sectional form/size over the entire length thereof, corresponding to the cross-sectional form/size of the instrument, so that the instrument housing renders possible partly a pushing-in of a (new intact) instrument in a locked operative position, partly a pushing-through/pushing-out of a (defective) instrument to be replaced.

The method according to the invention for the replacement of a unit in the form of an instrument or other device within an instrument housing wherein said instrument may be locked against being drawn or pushed out when mounted and exercising its function, but wherein said locking may be neutralized whenever the instrument owing to a defect or some other reason is to be replaced by a new intact instrument, consists fundamentally and briefly in neautralizing the locking of the defective instrument against being drawn or pushed out of the housing, whereafter the defective instrument is pushed out of the instrument housing by means of the locking-neutralizing tool which, in its turn, in one and the same pushing-in/pushing-out operation, is pushed out of the instrument housing by means of a new intact instrument which, thereby, simultaneously by means of a piston influenced locking tool being pushed into the instrument housing, therein taking the place and the position of the pushed-out defective instrument, whereafter the new intact instrument, which has been pushed into the instrument housing, is locked to the instrument housing by means of said locking tool which, fundamentally, may have the same structural construction as said locking-neutralizing tool both the locking-neutralizing tool and the new intact instrument are provided with suitable fluid sealing means. This sealing arrangement, in combination with the cross-sectional design of the locking-neutralizing tool/instrument in relation to said instrument housing, will prevent leakage via the instrument housing, out of as well as into those lines/hoses that might be coupled to the instrument housing. Thus, when the instrument housing has been coupled into a process/control line, contamination is avoided both of this line and the surroundings of this line during the instrument replacement.

The tool device, the instrument housing, the locking and locking-neutralizing tool and the method according to the invention are based partly upon linear displacement, partly upon simple rotation about an axis coinciding with the direction of displacement. Such simple non-composite movements render in the first place possible a simple replacement of instruments of the kind in question, and, secondly, the conditions are thereby well arranged and adjusted for remote control of the replacement operations.

BRIEF DESCRIPTION OF THE DRAWINGS

Examples of preferred embodiments of the invention are further explained in the following, reference being made to the accompanying drawings, wherein:

FIG. 2, in an axial section/side elevational view, shows the empty valve housing on a larger scale;

FIG. 3 in an axial section/side elevational view, shows a replaceable instrument in the form of a high pressure ball valve separately, i.e. without a surrounding valve housing;

FIG. 4 corresponds to FIG. 3, but here the axial section/side elevational view has been rotated 90 degrees in relation to FIG. 3, in order to show one of the two sets of balls incorporated into a locking mechanism for the locking of the valve to the valve housing;

FIG. 9—besides what has been shown in FIG. 7—showing guide pins serving to centralize/orient the tool in relation to adjacent units, e.g. within the charging chamber of the tool device.

DETAILED DESCRIPTION OF THE INVENTION

Figure 1:
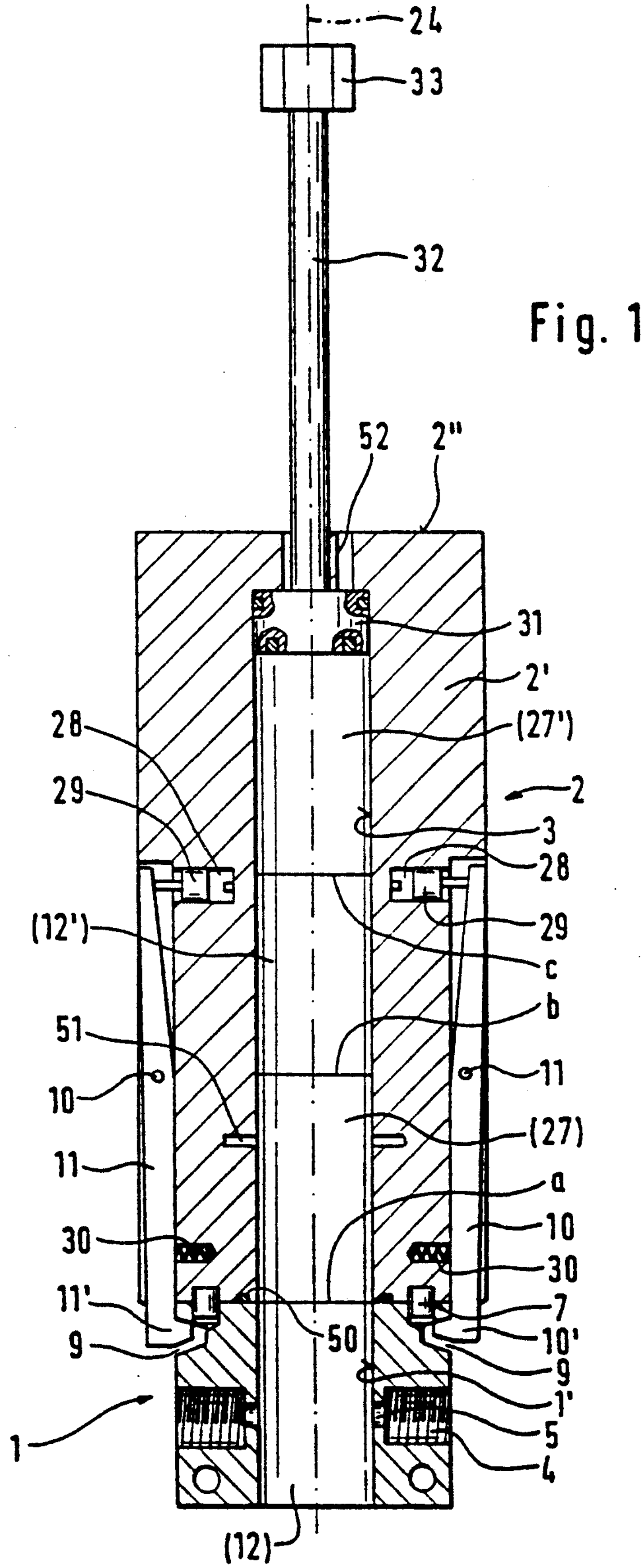
FIG. 1, in an axial section, shows an instrument housing in the form of a valve box or housing and a tool housing fixed and clamped to the valve housing, corresponding to the mutual positioning and interconnection of these two housings during the instrument/valve replacement operations; however, in this figure, one has, for the sake of clarity, omitted both the defective valve to be replaced within the valve housing, the new intact valve to replace the first-mentioned, as well as the tool serving to neutralize the locking of the defective valve to the valve housing, and, also, the tool serving to lock the new valve to the valve housing at the completion of the replacement operation; i.e. the valve housing as well as the tool housing are empty in this figure.

Fundamentally, the invention is based on the use of an "allround" instrument housing, i.e. a housing having a particular design allowing the accommodation of different kinds of instruments such as valves, sensors, measuring means, transducers, etc., and, likewise, wherein the housing enables a simple, rapid and efficient replacement of the instrument it accommodates. The instrument housing may be coupled into e.g. pneumatic and/or hydraulic control lines and shall not as such be replaced. The instrument housing construction may easily be made so simple and vigorous that it will have a practically non-limited working life, i.e. a working life corresponding to at least a normal time of use within the systems in question. In order to realize the instrument replacement, there has been constructed a special device, and this device is likewise comprised by the present invention. In order to distinguish between this replacement-effecting special device and the tools (locking tool, unlocking tool) it might accommodate, the device itself has been denoted "tool device" in the following. In FIG. 1, the instrument housing which in the following will be defined as the valve housing because the examplary embodiment shows a valve replacement, is denoted by the reference numeral 1; 2 indicating the tool device, the housing thereof being denoted 2'. In accordance with FIG. 1, the tool device is coupled to the valve housing 1 in order to prepare a valve replacement, but, as previously mentioned, the valve housing as well as the tool device have, for the sake of clarity, been shown empty in this figure.

However, in the through-going cavity 1' of the valve housing 1, a valve will be situated, and, in the charging chamber 3 of the tool device 2 (from below and upward according to FIG. 1), a locking-neutralizing tool, a new valve and a locking tool. The adjacent border or boundary surfaces between the various (not shown) valves/tools have been denoted a, b and c; a indicating the border surface between a non-shown defective valve within the valve housing 1 and a non-shown locking-neutralizing tool within the charging chamber 3; b indicating the border surface between said locking-neutralizing tool and a non-shown new valve within the charging chamber 3, whilst c indicates the border surface between said new valve and a non-shown locking tool (for the locking of this new valve to the valve housing 1) within the charging chamber 3.

The valve housing (see especially FIG. 2) is formed in one piece and, according to the embodiment shown, with so-called process couplings 4, here shown in the form of threaded aligned bores in fluid communication with the valve-accommodating cavity 1' of the valve housing 1 by means of a short bore or port 5 each, said ports 5 forming the so-called fluid line of the valve.

The cross-sectional form and size of the cavity 1' has been dimensioned with a view of allowing pushing-in, pushing-out and, thus, pushing-through of that valve or other instrument the housing 1 is to accommodate, and which, i.a. with regard to leakage-proof properties, will have slightly lesser external lateral dimensions. Also, it is appropriate that the valve/instrument has substantially the same axial length as the bore or cavity 1' of the housing, but, when an adjustable valve or an adjustable instrument is involved, e.g. having an adjustability between an open and a closed position, the valve/instrument might have an operating means projecting beyond the housing. This aspect will be explained further later.

Further, the valve housing 1 is provided with guides for the orientation of the tool device 2 in relation to the valve housing 1. At the valve housing 1, these guides have the form of axial guide holes 6 positioned at one axial end edge and wherein corresponding guide pins 7 on the adjacent end face of the housing 2' of the tool device 2 engage. In order to facilitate the guidance, preventing wedging, the guide pins 7 may be conical. When these guide means 6,7 are brought into engagement, the tool device 2 is centered with regard to the valve housing 1. The valve housing 1 has also been formed with lateral locking holes 8 in the housing wall. Displaceably arranged locking balls in the valve are intended to be brought into engagement with these locking holes 8 whenever a valve is in position within the valve housing 1. It will later be given an account of this locking mechanism including balls and locking holes 8. Further, the valve housing 1 is formed with an annular circumferential groove 9 having a trapeziodal cross-section.

Prior to and during the replacement operation, two or more pivotable catching hooks 10 are to engage into the circumferential groove 9, said hooks being suspended 11 as two-armed levers having hook-shaped ends 10' functioning as gripping or catching hooks. One will make further reference of this fixing or clamping mechanism 9;10,10',11 later in connection with the description of a valve replacement operation; it should only be mentioned here that the fixing/clamping is established prior to the initiation of the replacement operation and is being maintained until the latter is completed.

Figure 5:
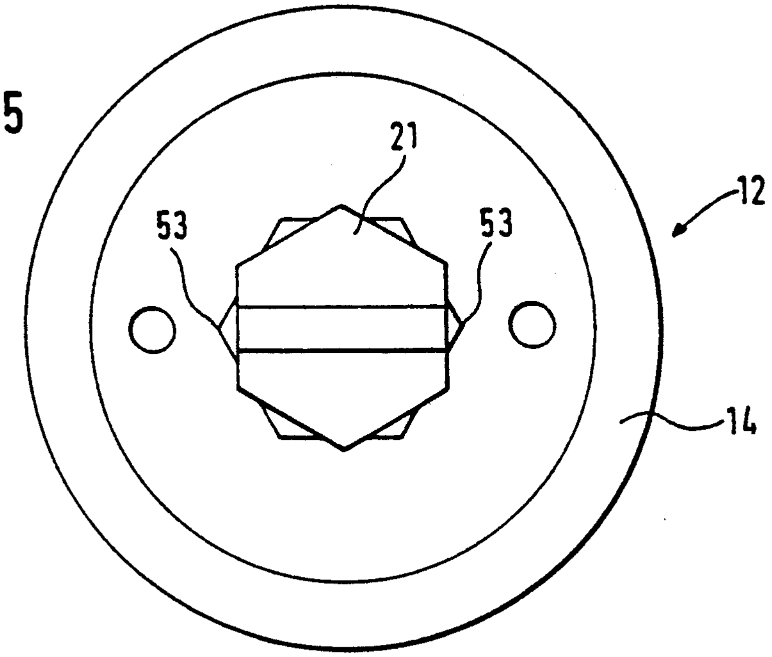
FIG. 5 is a top plan view of the valve according to FIGS. 3 and 4.

The instrument to be replaced according to the invention, is, in the embodiment shown, constituted by a valve generally denoted by the reference numeral 12, and which is shown separately in FIGS. 3-5. First, this valve 12 will be described quite briefly, a more detailed explanation following later.

The valve or another instrument capable of being replaced in accordance with the present invention, will comprise all functional components including wearing parts and seals influenced by use and age. The valve 12 is formed to fit fairly tightly within the cavity 1' of the valve housing 1 and is provided with all necessary support rings 13, seal carriers 14, seals 15 and a locking mechanism comprising said locking balls 16;16' for locking engagement into the locking holes 8 of the valve housing 1. The valve body has, as such, the form of a ball 17. The remaining structural construction and function of the valve are further explained in a later section.

Now, a brief preliminary description of the tool device 2 follows. The charging chamber 3 thereof is, as previously indicated, formed for the accommodation of i.a. at least one new valve 12, in order to enable the replacement of the valve in a valve housing 1 subsea. With subsea valves or other instruments, such a replacement operation will usually be effected by means of a remote operated so-called mini-submarine or a similar device. Additionally to the guide pins 7 and the clamping catching hooks 10,10', the tool device 2 might be formed in order to attend to special functions, especially directed to a special instrument, not shown.

Figure 6:
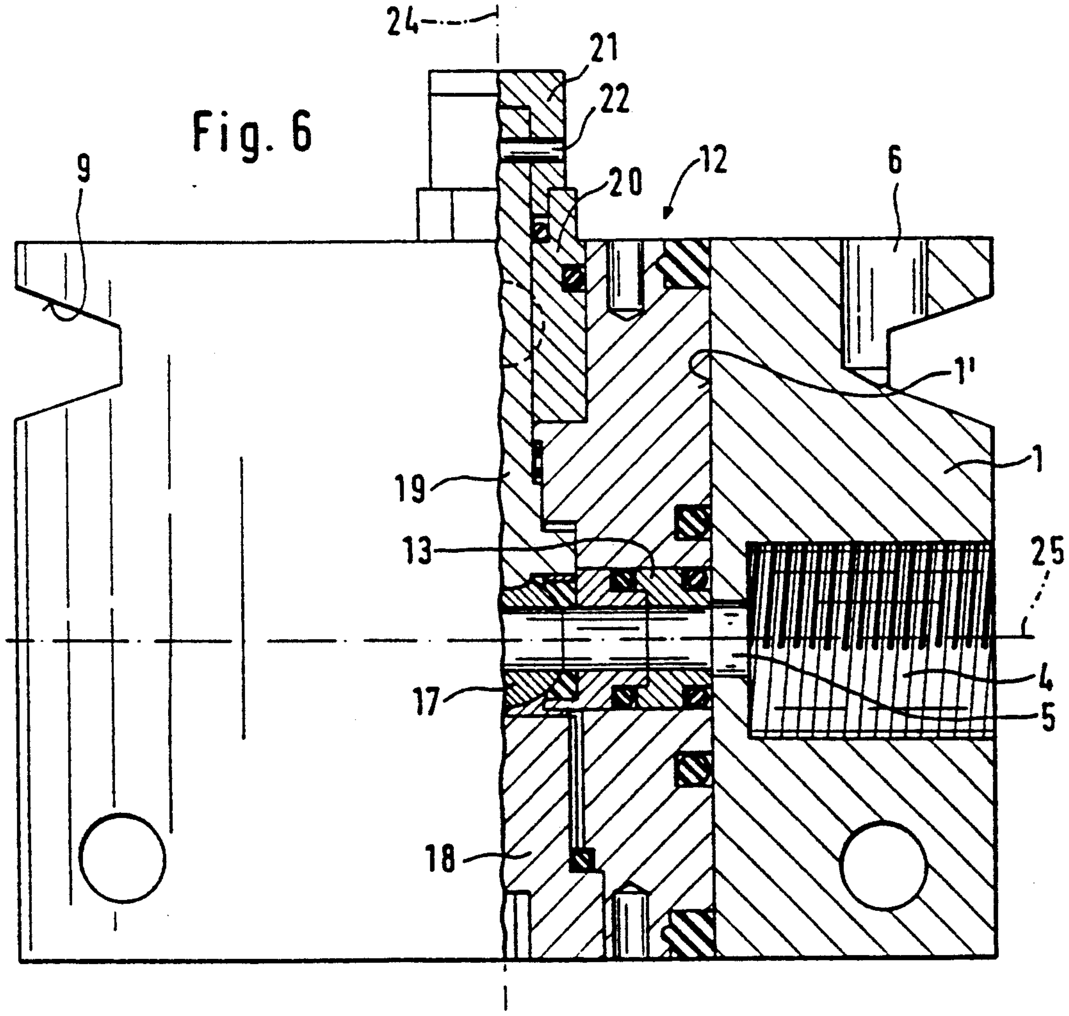
FIG. 6, in an axial section/side elevational view, shows the valve according to FIGS. 3-5 assembled with the valve housing according to FIGS. 1 and 2, the sectional plane corresponding to FIGS. 2 and 3.

Now, reference is made to FIGS. 3-6, especially to FIG. 6, wherein the valve 12 constitutes an insert within the valve housing 1. In addition to support rings 13, seals 15, valve ball 17 and locking balls 16;16', the valve 12 also comprises a bottom plug 18, a stem 19, a locking nut 20, an operating nut 21 as well as a locking pin 22. Moreover, the valve 12 comprises a number of circumferential grooves carrying seals/O-rings 23-23''' positioned with a particular axial spacing, in order to, at all times, maintain fluid impermeability regardless of the relative positions of the valve 12 and of the valve housing 1 along the common axis 24 thereof. When the valve 12 is in position within the valve housing 1, only the operating nut 21 and a short portion of the locking nut 20 project beyond the valve housing 1. Then, the axis 25 of the valve ball 17, the seal carriers 14 and the support rings 13 is aligned with the axis of the fluid bores 5 in the valve housing 1. Further, the valve has two diametrally opposite bores 26 for a pair of locking balls 16;16' each. The locking nut 20 is formed with a circumferential cavity 20' for the accommodation of a portion of the radially innermost ball 16 of each pair of balls. The cavity 20' is eccentrically formed with respect to the axis 24, so that a rotation of the locking nut 20 about said axis 24 causes a radially directed pushing-out of the balls 16;16' for the pushing-in of a portion of the outermost balls 16' into the locking holes 8 of the valve housing 1. In accordance with FIG. 4, the locking mechanism 16;16';20,20' occupies the non-active position thereof. A further description of the valve 12 follows in connection with the detailed explanation of the replacement operation.

In FIG. 1, in proportion to the mentioned border faces a–c, reference numerals in brackets indicate the positioning of two torsional keys, in the following denoted as first and second locking tool 27;27', and an intermediate new valve 12'.

Fundamentally, these locking tools 27;27' may have identical constructions, because they, in the exemplified embodiment, carry out a technically equivalent twisting function about the same axis 24. Consequently, only one locking tool 27 has been shown, FIGS. 7-10, and a further discussion thereof will follow.

The housing 2' of the tool device 2 is, in the area of the border face c, formed with diametrally opposite cylinder bores 28 for hydraulically operated pistons 29 adapted to activate the catching hooks 10 toward their clamping position and, thereby, bring the hook-shaped ends 10' into engagement with the circumferential groove 9 of the valve housing 1. When the hydraulic pressure is relieved subsequent to the completion of the replacement operations, compression springs 30 move the catching hooks back into non-active initial position.

In the charging chamber 3, a pushing-out piston 31 and piston rod 32 have been displaceably supported. The piston 31 is secured against rotation, the piston rod 32 for that purpose e.g. having a non-circular, e.g. hexagonal, cross-section and being guided within a correspondingly formed hole in the end 2'' of the tool housing 2' of the tool device 2. The piston 31 has a given length of stroke, determined by the longitudinal extent of the piston rod 32 to an end stop 33.

The guide pins 7 of the tool housing 2' are formed such that they do not get stuck within the guide holes 6 in the event of a slightly inaccurate design. In practice, this involves providing these pins with a connical design.

A locking tool (torsional key) 27 respectively 27'—the location thereof being denoted "(27)" and "(27')" in FIG. 1—is further shown in FIGS. 7-10. Each of these locking tools consists of a cylindrical key housing 34 having a through-going bore 35 and two diametrically opposite axially extending oblong grooves 36 through the wall of the key housing 34. Further, the key housing 34 is formed with five circumferential grooves (lacking reference numeral) at the external mantle thereof. The grooves have a special mutual spacing from each other and serve the purpose of accommodating a seal/0-ring 37 each. Within the throughgoing bore 35 of the key housing 34, a slide ring 38 has been arranged for sliding between an intermediate floor 39 and a socket wrench 40, the hexagonal hole of the latter being denoted 40'. The socket wrench 40 is formed with two diametrally opposite helical grooves 41 (see especially FIG. 10) through the wall. In order to lock the socket wrench 40 within the key housing 34, a locking ring has been provided within a locking ring groove 42.

Through the helical grooves 41 in the socket wrench 40 and the axially extending oblong grooves 36 in the key housing 34, extends a moment pin 43, which is mounted within a bore in the lower end of a central piston rod 44. In the opposite upper end of the piston rod 44, sits a torsional piston 45 which, through bores 46 in the wall of the key housing 34, is supplied with hydraulic pressure fluid for activation. The key housing 34 is formed with guide holes 47 at both ends for guide pins 48, for the purpose of balancing the torsional moment, as well as preventing rotation during displacement (in replacement operations).

The mode of operation of the invention is as follows: When the valve 12—or another instrument—and the valve housing 1 (the instrument housing) are interconnected and occupy the operative position thereof, the locking nut 20 keeps the locking balls 16' in locking engagement within the locking holes 8 of the valve housing 1, so that the valve 12 is locked against extraction/withdrawal/pushing-out from the valve housing 1. In this position, the support rings 13 rest against the wall portions defining the bore 1' in the valve housing 1, so that the same proportion between the seal carriers 14 and the valve ball 17 as in an ordinary ball valve is attained.

Now, by means of the operating nut 21, the stem 19 may activate the valve ball 17, so that the valve 12 is opened/closed. This opening/closing may be effected either by means of a special tool, a hand tool or a stationary operating handle.

When an instrument, e.g. the valve 12, within the valve housing 1 according to FIG. 6, is to be replaced, this operation requires a charging of the charging chamber 3 of the tool device 2 above water. This is effected through withdrawal of the pushing-out piston 31 to its innermost position, FIG. 1. Thereafter, second locking tool 27' is pushed so far into the charging chamber 3 that the inner end face thereof becomes resting against the active face of the piston 31. It is the purpose of this second locking tool 27' to lock the new valve 12' against being pulled out subsequent to having occupied an operative position within the valve housing 1 (which is presupposed to be situated close to the seabed). Thereafter, the new valve 12' is pushed into the charging chamber 3 until it comes to rest, end face to end face, against the external border face of the key housing 34. Finally, the first locking tool 27 is pushed into position within the charging chamber 3. It is the purpose of the first locking tool 27 to neutralize the locking 16';20 of the defective valve 12 to the valve housing 1.

New valve 12' and locking tools 27;27' are pushed into the charging chamber 3 of the tool device 2 by means of a conical pushing-in device (not shown) urging the seals 23-23''' and 49 and the seals 37 respectively into position during the pushing-in of the valve 12' and the locking tools 27;27' respectively into the charging chamber 3.

During said charging, co-operating guide pins/guide holes 48,47 of adjacent units 27;12';27' provide for the correct positioning of both valve 12' and locking tools 27,27' in relation to the piston 31. In finished charged condition, the first locking tool 27 will be aligned with the lowermost end face (border surface a) of the tool housing 2'.

The tool device 2 is constructed such that piston rod 32, catching hooks 10 and guide pins 7 lay protected within cavities in the tool housing 2'. Therefore, possible collision on the way toward the valve housing 1, is unlikely to cause tool average or other damage.

Now, the tool device 2 has been charged and is ready for being mounted onto a remote controlled subsea vessel.

The defective valve 12 (FIG. 6) may now be replaced with a new intact valve 12' (FIG. 1) in accordance with the following procedure:

A remote controlled subsea vessel (mini-submarine), not shown, is controlled to bring the charged tool device 2 to the seabed where the defective valve 12 to be replaced is identified. The tool device 2 is manoeuvred such that the guide pins 7 are brought into engagement with the the guide holes 6 in the valve housing 1. If the charging chamber 3 of the tool device 2 is not centered with accuracy in relation to the valve housing 1, correct centering will be established when the catching hooks 10 are activated.

The catching hooks 10 are brought to draw the tool device 2 toward the valve housing 1, a sealing ring 50 within a circular groove in the end face of the tool housing 2', at the guide pins 7 will come to rest sealingly against the opposing stop face at a of the valve housing 1, preventing sea water and other contaminations from penetrating into the valve housing 1 as long as the replacement operation proceeds. In order to urge the defective valve 12 out, the locking mechanism 20;16;16';8 must be deactivated first. This is effected by supplying hydraulic pressure to the first locking tool 27 via an opening 51 in the tool housing 2' and the bore 46 in the keyhousing 34. This causes a displacement of the torsional piston 45, during which it takes with it the moment pin 43, which is prevented from rotating because of the guidance thereof within the axially extending oblong grooves 36, see FIG. 10. Consequently, the engagement of the linearly displaceable moment pin 43 within the helical grooves 41 of the socket wrench 40, causes a rotation of socket wrench 40 and locking nut 20. The locking nut 20 is rotated e.g. 90 degrees, giving the locking balls 16;16' the opportunity of moving radially inwardly, releasing them from their locking engagement with the locking holes 8 of the valve housing 1. The movement of the locking balls 16;16' between an active and an inactive position may easiest be achieved through an eccentric design of the circumferential groove 20' wherein they are accommodated within the locking nut 20. However, there is, of course, nothing to prevent the use of an entirely different locking mechanism.

Now, the conditions have been arranged for a simple pushing-in of the new valve 12' into the valve housing 1 still accommodating the defective valve 12 which, however, is retained therein only through friction between the seals 23-23''' and 49 and the cavity-defining internal surface of the valve housing 1.

The pushing-in of the new valve 12' into the valve housing 1 takes place during one continuous piston stroke through supplying hydraulic pressure to the charging chamber 3 through an axial inlet 52 in the end wall 2'' of the tool housing 2', so that the pushing-out piston 31 first urges out the defective valve 12 from the valve housing 1 via first locking tool 27, new valve 12' and second locking tool 27', whereafter first locking tool 27 is pressed through and out of the valve housing 1 via new valve 12' and second locking tool 27', the new valve 12' in immediate association therewith being urged into the valve housing 1. Hereby, the length of stroke of the pushing-out piston 31, through piston rod length/end stop 33, is adjusted such that a further movement of the pushing-out piston is prevented subsequent to the end faces of new valve 12' being aligned with the end faces of the valve housing 1.

Now, the new valve 12' is in position in the valve housing 1, and it only remains to lock the same against extraction/pushing-out from the valve housing 1. For this purpose, second locking tool 27' is activated. Now, the latter occupies such a position within the charging chamber 3 that it receives hydraulic pressure from the same opening 51 in the tool housing 2' as supplied hydraulic pressure to first locking tool 27 during the preceding twisting operation (when releasing defective valve 12).

Supply of hydraulic pressure to second locking tool 27' through the opening 51 in the tool housing 2' provides now for the locking of the valve 12' within the valve housing 1 against rotation as well as against axial displacement, the locking nut 20 being rotated e.g. 90 degrees by means of the socket wrench 40. The direction of rotation is without significance, the question being merely to bring the locking balls 16' into engagement with the locking holes 8 of the valve housing 1.

An indicator 53 on the locking nut 20 may indicate that the new valve 12' has been locked. Thereby, the very replacement of valve is completed.

Now, the catching hooks 10,10' are brought out of engagement with the circumferential groove 9 of the valve housing 1, and the subsea vessel pulls the tool device 2 back into an inactive position and leaves the place with the tool device 2 and the second locking tool 27' intact within the charging chamber 3 of the tool device 2. The first locking tool 27 may be left on the seabed together with the defective valve 12, or may, alternatively, be brought back to the surface by means of the subsea vessel.

Because of the slight volume present between the tool device 2 and the two valves 12;12' subsequent to the tool device 2 being placed into position on the valve housing 1, there exists no risk that contaminations such as sea water shall penetrate into the fluid passage 5 during the replacement operation.

Figure 7:
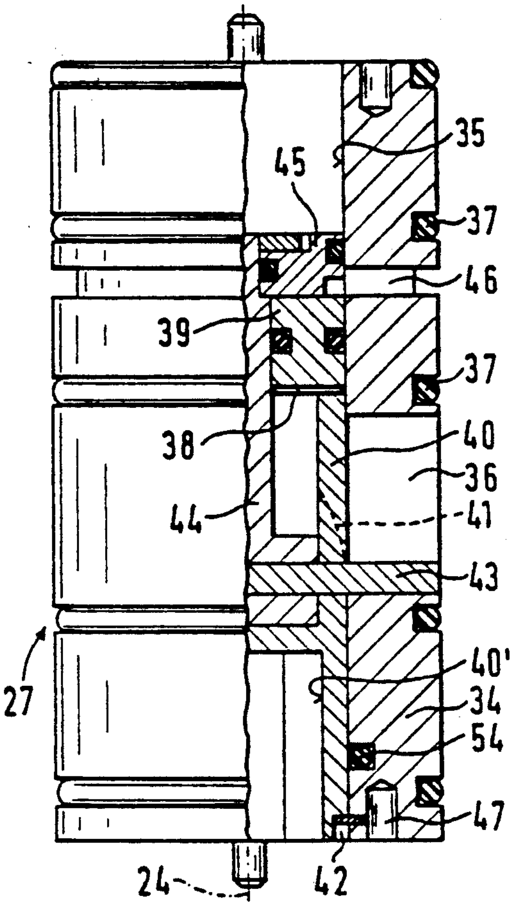
FIG. 7, in an axial section/side elevational view, shows a tool adapted to lock/neutralize locking of a valve to the valve housing.
Figure 8:
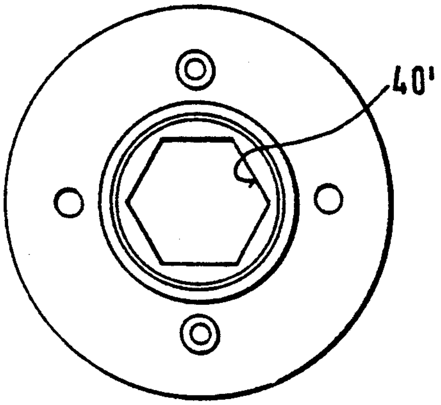
FIG. 8 is a bottom plan view of the tool according to FIG. 7.
Figure 9:
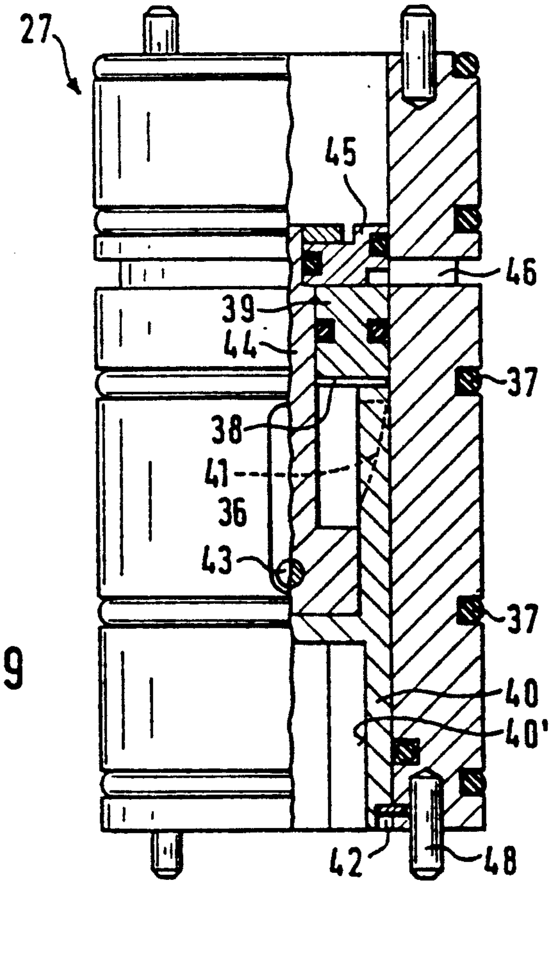
FIG. 9 corresponds to FIG. 7, but here the side elevational view/the axial plane has been rotated 90 degrees in relation to FIG. 7.
Figure 10:
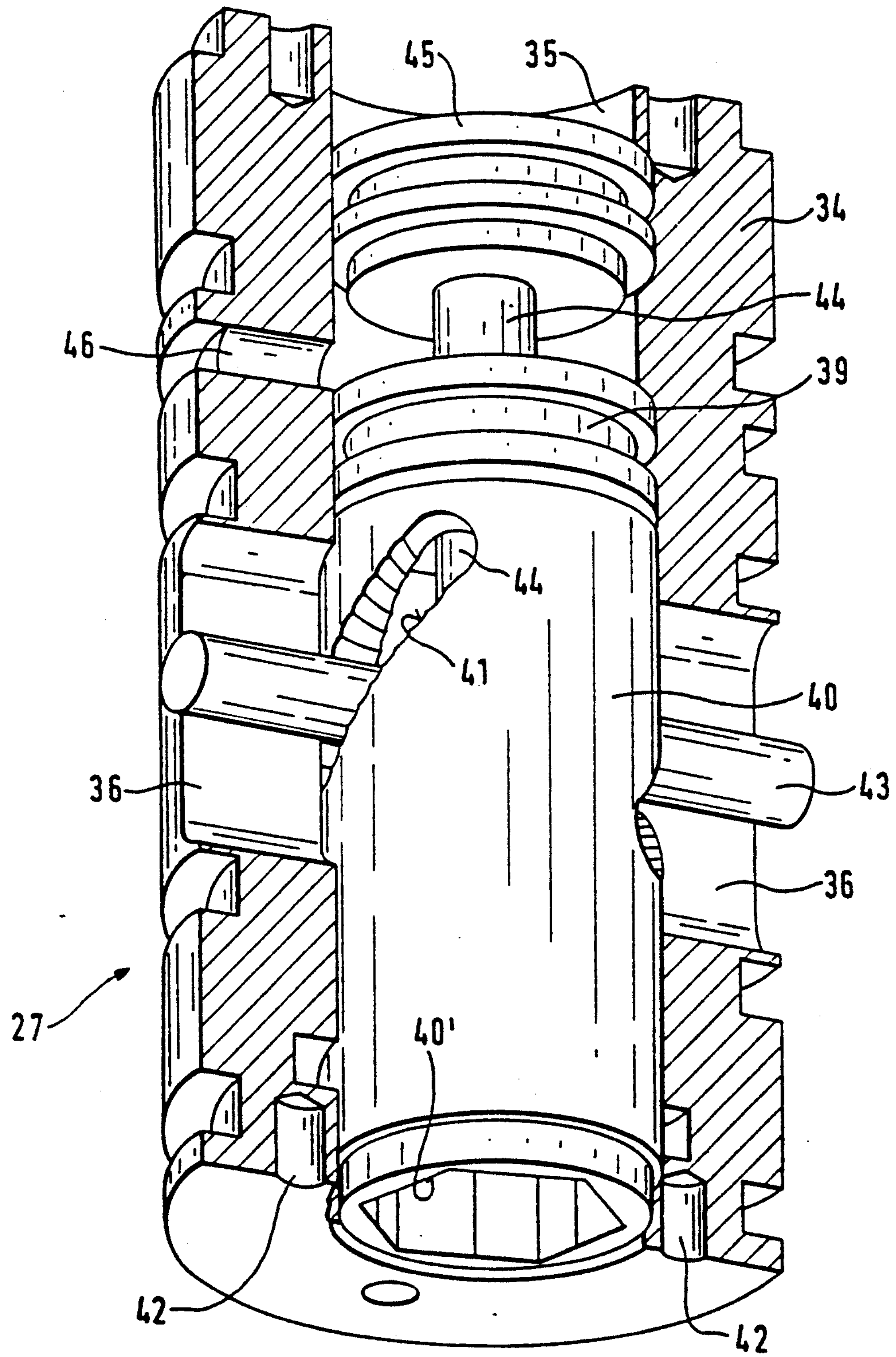
FIG. 10 in perspective, slopingly from below, shows the tool according to FIGS. 7-9, in order to better illustrate the power transferring and converting mechanism adapted to convert linear piston movement into locking/locking-neutralizing rotary movement, the power transferring and converting mechanism of FIG. 10 being shown as not being cut through, whilst a surrounding housing have been shown in longitudinal section.

The seals 23–23''' and 49, FIGS. 3 and 4, are positioned and designed such that sea water/contaminations are unable to penetrate into the fluid passage 5 from below the valve while the pushing-in of new valve 12' proceeds, the seals 37 and 54, FIG. 7, preventing sea water from penetrating into the tool device 2 prior to the pushing-in of valve.

I claim:

1. A tool device for use in replacing an instrument which, in an operative position thereof, is surrounded by an instrument housing which may be coupled into a fluid line disposed in a normally inaccessible or dangerous location, and wherein said instrument, in said operative position thereof, is locked by locking means against movement within the instrument housing, the tool device comprising a tool housing having a charging chamber adapted to receive at least a first tool in the form of an unlocking tool for neutralizing the locking of the instrument to the instrument housing, at least one replacement instrument having a design identical to that of said instrument to be replaced, at least one second tool in the form of a locking tool for locking the replacement instrument to the instrument housing and a pushing device adapted to move the instrument to be replaced out of said instrument housing and said first tool through and out of said instrument housing sequentially, as well as to move the replacement instrument into the instrument housing.

2. The tool device of claim 1, wherein the pushing device comprises a piston and a piston rod having a non-circular cross-section, said piston rod being guided and moved within a correspondingly shaped hole in one end portion of the tool housing, said piston rod having an end stop for limiting the movement of the piston, upon the replacement instrument being moved out of the charging chamber and into the instrument housing.

3. The tool device of claim 1 wherein at least two clamping means are pivotally supported on said tool housing, one end of each of said clamping means being formed with a hook and having operating means at the opposite end thereof actuable to move said hook into clamping engagement with an external groove formed in the instrument housing.

4. The tool device of claim 3, wherein each of the clamping means comprises a two-armed level, said instrument housing having cavities for receiving each lever which is spring-loaded to a non-clamping position.

5. An instrument housing for use in replacing an instrument which, in an operative position thereof, is surrounded by said instrument housing which may be coupled into a fluid line disposed in a normally inaccessible or dangerous location, and wherein said instrument, in said operative position thereof, is locked against relative movement within the instrument housing, the instrument housing being a one-piece member and comprising a through-going, substantially cylindrical instrument-accommodating cavity provided with locking means for releasible cooperation with corresponding means on the instrument, and an external circumferential groove of an inwardly tapering, trapezoid-shaped cross-section adapted to clampingly engage a clamping device provided on a tool device usable during the replacement operation, wherein the instrument housing is provided with guide holes or pins for engaging complementary guide means on said tool device when said tool device is moved into clamping engagement with said instrument housing, and wherein the instrument housing is formed with, in relation to the axis of the cavity, lateral connectors for a fluid line, said connectors having bores being in fluid communication with the cavity of the instrument housing.

6. Improvements in a locking tool for use with a tool device employed to replace an instrument which, in an operative position thereof, is surrounded by an instrument housing which may be coupled into a fluid line disposed in a normally inaccessible or dangerous location, and wherein said instrument, in said operative position thereof, is locked by said locking tool against movement out of said instrument housing, said instrument housing having a through-going, instrument-accommodating cavity providing with locking means for releasible cooperation with corresponding means on the instrument to retain said instrument in said housing, said tool device comprising a tool housing having a charging chamber adapted to receive a tool in the form of an unlocking tool for neutralizing the locking of said instrument to the instrument housing by said locking means, and wherein the locking means preventing relative movement of the instrument within the instrument housing in the operative position may be activated or released for, respectively, establishing or neutralizing the releasible cooperation of the locking means on the instrument and the housing through a predetermined rotation of the parts, and wherein the instrument, for that purpose, has operating means associated therewith, said locking tool comprising a key housing provided with a corresponding, complementary operating means to that of said instrument, said locking tool operating means being adapted to be rotated by a predetermined angle, said locking tool further comprising an actuation piston which is operably interconnected to said locking tool operating means and which is actuable by fluid pressure introduced through a bore in the wall of the key housing of the locking tool, said bore being adapted to correspond with a bore in said tool housing when the locking tool occupies an active position within the charging chamber of said tool housing.

7. The apparatus of claim 6, wherein the locking tool operating means comprises a socket wrench provided in said key housing, said socket wrench being operably connected to said actuation piston by a lateral moment pin guided within axially extending oblong grooves in the wall of the key housing, said actuation piston having a piston rod with a bore therethrough, said pin extending through helical grooves formed in the socket wrench as well as through the bore in the piston rod.

8. The apparatus of claim 7, wherein the internal wall face of the key housing adjacent the free end of the socket wrench is formed with a circumferential groove for a seal or O-ring.

9. The apparatus of claim 6, wherein the instrument and locking tool have substantially mutually identical external shape, cross-sectional shape and are each sized slightly less than the cross-sectional shape and size of the instrument housing cavity, the instrument and locking tool preferably having the same axial length, the external surface of the instrument housing and the key housing each being formed with a plurality of circumferential grooves for seals or O-rings, said grooves having a predetermined mutual spacing.

10. The apparatus of claim 9, characterized in both the instrument and locking tool are equipped with mutually cooperating axially extending pins or holes in mutually adjacent end faces in order to come into correct position in relation to each other.

11. The apparatus of claim 6, wherein the instrument operating means is provided with an indicator defining whether the instrument is locked or not locked within the instrument housing.

* * * * *